(12) United States Patent
Cohen

(10) Patent No.: US 8,658,117 B2
(45) Date of Patent: Feb. 25, 2014

(54) PRODUCTION OF AMMONIUM PHOSPHATES

(75) Inventor: Yariv Cohen, Uppsala (SE)

(73) Assignee: EasyMining Sweden AB, Uppsala (SE)

( * ) Notice: Subject to any disclaimer, the term of this patent is extended or adjusted under 35 U.S.C. 154(b) by 0 days.

(21) Appl. No.: 13/322,619

(22) PCT Filed: Sep. 18, 2009

(86) PCT No.: PCT/SE2009/051041
§ 371 (c)(1),
(2), (4) Date: Nov. 28, 2011

(87) PCT Pub. No.: WO2010/138045
PCT Pub. Date: Dec. 2, 2010

(65) Prior Publication Data
US 2012/0070359 A1    Mar. 22, 2012

(30) Foreign Application Priority Data
May 27, 2009    (SE) ...................................... 0950376

(51) Int. Cl.
*C01B 25/28*    (2006.01)

(52) U.S. Cl.
USPC .......................................... 423/308; 423/310

(58) Field of Classification Search
USPC ........... 423/305, 308–321.2, 311, 312; 71/33, 71/34, 36, 38; 210/906
See application file for complete search history.

(56) References Cited

U.S. PATENT DOCUMENTS

| 3,019,099 A | 1/1962 | Walters, Jr. |
| 3,298,782 A | 1/1967 | Archambault et al. |
| 3,304,157 A | 2/1967 | Baniel et al. |
| 3,323,863 A * | 6/1967 | Seymour ........................ 423/310 |
| 3,342,579 A | 9/1967 | Frazier |
| 3,415,619 A * | 12/1968 | Young ............................ 423/305 |
| 3,458,282 A | 7/1969 | Koerner et al. |
| 3,573,005 A | 3/1971 | Baniel et al. |
| 3,894,143 A | 7/1975 | Von Semel et al. |
| 4,112,118 A | 9/1978 | Cussons et al. |
| 4,592,771 A | 6/1986 | Benjamin et al. |

FOREIGN PATENT DOCUMENTS

| GB | 636035 | 4/1950 |
| GB | 1379796 | 1/1975 |
| RU | 2296729 | 4/2007 |
| WO | 2008/115121 | 9/2008 |

OTHER PUBLICATIONS

International Search Report dated Apr. 27, 2010, corresponding to PCT/SE2009/051041.

* cited by examiner

*Primary Examiner* — Steven Bos
*Assistant Examiner* — Justin Bova
(74) *Attorney, Agent, or Firm* — Young & Thompson

(57) ABSTRACT

A method for production of ammonium phosphates includes providing (210) of a phosphorus-loaded water immiscible liquid phase, adding (212) of anhydrous ammonia to the water immiscible liquid phase, precipitating (214) of mono-ammonium phosphate and/or di-ammonium phosphate from the water immiscible liquid phase and extracting (218) of the precipitated mono-ammonium phosphate and/or di-ammonium phosphate from the water immiscible liquid phase. The method further includes controlling (216) of a temperature of the water immiscible liquid phase during the adding (212) and precipitating (214) to a predetermined temperature interval.

10 Claims, 6 Drawing Sheets

PRODUCTION OF AMMONIUM PHOSPHATES

TECHNICAL FIELD

The present invention relates in general to production of ammonium phosphates from phosphorus-containing solutions.

BACKGROUND

Phosphate rock (apatite) is the primary commercial source of phosphorus. The majority of the world's phosphate production is used to manufacture fertilizers to sustain agricultural production. The quality of phosphorus reserves is declining and the cost of extraction and processing is increasing. Associated heavy metals like cadmium substituting calcium can be present in phosphate rock at high levels requiring separation. Several countries restrict heavy metal levels in fertilizers. For example, in Sweden P fertilizers having cadmium contents above 5 mg Cd/kg P are imposed with a tax. Some European fertilizer producers have switched suppliers importing only raw material that have set cadmium limits.

All water-soluble phosphate salts such as soluble fertilizers are derived from phosphoric acid. Phosphoric acid is produced commercially by either a 'wet' or a thermal process. Wet digestion of phosphate rock is the most common process. Thermal processing is energy intensive and therefore expensive. For that reason, quantities of acid produced thermally are much smaller and mainly used for production of industrial phosphates.

Phosphoric acid for fertilizer production is almost solely based on wet digestion of rock phosphate. The process is mainly based on dissolution of apatite with sulfuric acid. After dissolution of the rock, calcium sulfate (gypsum) and phosphoric acid are separated by filtration. To produce merchant-grade phosphoric acid, high acid concentrations are required and water is evaporated. Calcium sulfate exists in a number of different crystal forms depending on the prevailing conditions such as temperature, phosphorus concentration in the slurry, and level of free sulfate. Calcium sulfate is either precipitated as dihydrate ($CaSO_4.2H_2O$) or as hemi-hydrate ($CaSO_4.\frac{1}{2}H_2O$). Phosphoric acid produced through this process is characterized by a low purity.

All ammonium phosphate salts are derived from phosphoric acid. Merchant-grade phosphoric acid, having a concentration of about 54% $P_2O_5$, is neutralized with ammonia to form either mono-ammonium phosphate (MAP) or di-ammonium phosphate (DAP) by controlling the ammonia to phosphoric acid mole ratio during the neutralization process. Ammonia is used in liquid or gaseous form. Liquid anhydrous ammonia is usually preferred since surplus heat from other systems is necessary for vaporizing liquid ammonia into a gaseous form. The neutralization of merchant-grade phosphoric acid with ammonia is usually performed in several stages using several reaction vessels. The mole ratio of ammonia to phosphoric acid in the pre-reactor/s is normally held at a level which gives the maximum solubility for the slurry (between 1.4 and 1.45 for production of DAP and usually less than 1 for production of MAP). For operation control, the ammonia to phosphoric acid mole ratio is determined by monitoring the pH of the slurry. Excess heat of reaction is removed from the pre-neutralizer/s by adding water to the reactor/s. Evaporation of the water cools the slurry. As the mole ratio of ammonia to phosphoric acid is increased over 1, un-reacted ammonia escapes from the reactor and the gaseous vapors released must be scrubbed with an acid. The slurry from the pre-neutralization reactor/s which usually contain between 16 to 23% water is usually fed into an ammoniator-granulator to complete the addition of ammonia for the desired product. Completion of the neutralization and additional evaporation of water results in solid particles being formed. It is necessary to recover the un-reacted ammonia from the gaseous vapors by scrubbing with an acid. Thereafter, the solid ammonium phosphates are usually dried in a separate reactor to reduce moisture content. Loss of ammonia from the dryer is usually recovered by scrubbing with acid. The solid ammonium phosphates are normally cooled by passing air through a cooling reactor.

For several applications such as fertigation (the application of water-soluble fertilizers in the irrigation water) and foliar fertilization (spraying fertilizers on leaves) there is a need for fully-soluble ammonium phosphates to avoid clogging of the fertigation equipment by non-dissolved solids. Wet-process phosphoric acid contains a substantial amount of impurities such as iron, aluminum, calcium, magnesium, cadmium, etc. which form water-insoluble solids upon neutralization with ammonia and thus fertilizer-grade ammonium phosphates are not completely water-soluble. Therefore, fully-soluble P fertilizers for fertigation purposes must be specially produced from purified phosphoric acid.

The current technology for phosphoric acid purification is based on extraction of impure wet-process phosphoric acid into an organic solvent (ketones, tri-alkyl phosphates, alcohols, etc.) followed by back extraction with water forming a dilute and pure phosphoric acid which is thereafter concentrated by water evaporation. Purified phosphoric acid is thereafter neutralized with ammonia forming fully-soluble ammonium phosphate products according to the procedure described above.

In general, two processes for solvent extraction of phosphoric acid can be identified: a) partial extraction of phosphoric acid from concentrated solutions, and b) complete extraction of phosphoric acid in the presence of other acids or salts.

Partial extraction of phosphoric acid from concentrated phosphoric acid produced by digestion of apatite with sulfuric acid is the most common process. In this process, only part of the phosphoric acid is extracted into an organic phase. The remaining non-extracted phosphoric acid together with metal impurities is used for production of low-grade phosphate salts such as different fertilizers. Any solvent capable of solvating phosphoric acid can be used in this process, both solvents that have a reasonably constant distribution coefficient down to fairly low concentrations such as alcohols, and solvents which show very little extraction capacity for phosphoric acid below a specific threshold concentration, i.e., the distribution coefficient is very sharply concentration dependent such as for ethers, esters and selected ketones.

A different approach is to obtain complete extraction of phosphoric acid in the presence of high concentrations of other acids or salts. The addition of a second acid such as $H_2SO_4$ (U.S. Pat. No. 3,573,005) or a salt such as $CaCl_2$ (U.S. Pat. No. 3,304,157) can improve the distribution coefficient (the distribution ratio of solute between the organic and aqueous phases) of phosphoric acid even at fairly low phosphoric acid concentrations. Although the added acid is also extracted by the solvent its proportion in the organic solvent is normally less than that in the feed solution. Suitable solvents are alcohols, trialkyl phosphates such as tributyl phosphate, etc. which show reasonably constant distribution coefficients down to fairly low phosphoric acid concentrations. The method is recommended for extracting phosphoric acid from remaining impure phosphoric acid resulting from the partial extraction process. A main disadvantage of this approach is that the final aqueous phase is rich in the added acid (i.e. sulfuric acid) or salts together with impurities, which might not have a final use.

The disadvantages of the state-of-the art technologies for production of ammonium phosphates are numerous. The phosphoric acid as produced from the gypsum filter is not suitable for direct manufacture of ammonium phosphate salts. The acid must be further concentrated by water evaporation to a suitable phosphoric acid concentration (usually about 54% $P_2O_5$). Normally, concentration of phosphoric acid is done in three stages. The weak acid from the filter (28% $P_2O_5$) is evaporated to 40% $P_2O_5$ in a single stage vacuum evaporator. The acid is then clarified to remove precipitated solids and the clarified acid is then concentrated to 54% $P_2O_5$ in two stages. The inter-stage concentration is about 48% $P_2O_5$. The 54% $P_2O_5$ acid is used for ammonium phosphate production according to the procedure described above.

To concentrate acids through evaporation is a very energy-intensive process. The amount of steam required for concentrating phosphoric acid usually varies between 2.5-5 tons of steam per ton of phosphorus, depending on production conditions. The energy demand for concentration of phosphoric acid is a major production cost. Expensive equipment such as steam distribution systems, evaporators, effluent gas scrubbers, condensation systems, cooling water systems, liquid effluent treatment systems and acid storage facilities are necessary for production of merchant-grade phosphoric acid. Furthermore, additional equipment is needed for the neutralization of phosphoric acid with ammonia in several stages, drying, cooling and scrubbing of ammonia from gaseous vapors. A major disadvantage is that the quality of the ammonium phosphate product is set by the quality of the apatite raw-material. Produced ammonium phosphates of fertilizer grade are generally contaminated with heavy metals such as cadmium and are not fully-soluble and therefore not suitable for use in applications such as fertigation.

Production of completely-soluble ammonium phosphate salts (technical grade) is more complex and requires purification of merchant-grade phosphoric acid by solvent extraction prior to neutralization with ammonia. The energy costs for water evaporation in this process are much higher since the phosphoric acid needs to be concentrated twice: a) the acid must be concentrated prior to solvent extraction, and b) the purified phosphoric acid is dilute and has to be concentrated again by water evaporation. Additional equipment for production of fully-soluble ammonium phosphates includes facilities for pretreatment prior to solvent extraction, liquid-liquid extraction equipment, liquid-liquid stripping equipment and evaporators for concentrating purified acid.

U.S. Pat. No. 3,298,782 describes a process for the purification of wet-process phosphoric acid which consists of a) extracting phosphoric acid from an aqueous phase to an alcohol-amine organic phase, b) separating the alcohol-amine phase from the aqueous phase, and c) recovering purified phosphoric acid from the alcohol-amine phase. The main objective was to recover purified phosphoric acid by back-extraction with water. In the text it is also mentioned that phosphate salts can be recovered from the alcohol-amine phase by reaction with a base. In one of the examples, an aqueous ammonia solution was used to strip the phosphate from the organic phase into an aqueous phase.

U.S. Pat. No. 3,458,282 describes a method for purifying phosphoric acid by utilizing an amine dissolved in an organic diluent (e.g. kerosene) as an extractant phase to remove either certain impurities from phosphoric acid or to extract phosphoric acid from the aqueous phase. When phosphoric acid was extracted with the amine-diluent solvent, the main objective was to obtain purified aqueous phosphoric acid by back-extraction with water, or to obtain an aqueous phosphate salt solution by reaction with an aqueous base. In the patent text it is also mentioned that it may be possible to remove phosphate from the amine by vaporizing off the organic diluent and treating the remaining material with an aqueous solvent or a gas such as ammonia to precipitate phosphate. To vaporize and condense very large quantities of an organic diluent such as kerosene is both costly and complex.

U.S. Pat. No. 3,894,143 describes a process for obtaining crystallized ammonium phosphate of good quality from wet-process phosphoric acid and ammonia. The process consists of a) forming a mixture of aqueous phosphoric acid and acetone in which all components are miscible with water, b) precipitating impurities by addition of ammonia and separating the precipitated impurities to form a purified mixture, c) contacting the purified mixture with ammonia to produce ammonium phosphate crystals and a supernatant liquid, and d) Separating the ammonium phosphate crystals from the supernatant liquid and distilling the supernatant to separate the acetone for recycling. The disadvantages of this method include distillation of large quantities of acetone, limited yield of ammonium phosphates, and production of large quantities of dilute aqueous ammonium phosphate effluents. The process was therefore not applied in the industry.

In the published international patent application WO 2008/115121, a method and an arrangement for phosphorus recovery are disclosed. Phosphorus ions are extracted from solutions by adsorbing phosphorus ions in a scavenger and by releasing the phosphorus ions into an eluate during regeneration of the scavenger. The regeneration is performed by ammonia. Phosphate anions are precipitated in form of tri-ammonium phosphate upon introduction of excess amounts of ammonia. The ammonia remaining in solution after the precipitation of tri-ammonium phosphate is reused for regenerating the scavenger. Unfortunately, tri-ammonium phosphate is unstable at ambient temperature and atmospheric pressure resulting in the decomposition of the crystal accompanied with release of ammonia. Such unstable crystalline solid is not suitable for direct use in agriculture.

There is a need for an improved method for production of fully-soluble ammonium phosphates such as mono-ammonium phosphate (MAP) or di-ammonium phosphate (DAP), in which the costs associated with the concentration of phosphoric acid by evaporation of water are excluded.

SUMMARY

A general object of the present invention is to improve methods and devices for production of ammonium phosphate from phosphorus-containing solutions. A further object of the present invention is to provide a method for production of fully-soluble ammonium phosphates without the need for concentrating phosphoric acid by evaporation of water. Another object of the present invention is to provide a cost effective method for production of ammonium phosphates without the need for drying and scrubbing ammonia from effluent vapors. A further object of the present invention is to provide recovered ammonium phosphates in a form that easily can be utilized for fertilizing purposes.

The above objects are achieved by methods and devices according to the enclosed patent claims. In general words, in a first aspect, a method for production of ammonium phosphates comprises providing of a phosphorus-loaded water immiscible liquid phase, adding of anhydrous ammonia to the water immiscible liquid phase, precipitating of mono-ammonium phosphate and/or di-ammonium phosphate from the water immiscible liquid phase and extracting of the precipitated mono-ammonium phosphate and/or di-ammonium phosphate from the water immiscible liquid phase. The method further comprises controlling of a temperature of the water immiscible liquid phase during the adding and precipitating to a predetermined temperature interval.

In a second aspect, an arrangement for production of ammonium phosphates comprises a mixing volume. The mixing volume has an inlet adapted for a phosphorus-loaded water immiscible liquid phase and an inlet adapted for adding of anhydrous ammonia into the water immiscible liquid phase. The arrangement further comprises a heat exchanger arranged in thermal contact with the water immiscible liquid phase. A controller is arranged for operating the heat exchanger to keep the water immiscible liquid phase in the mixing volume within a predetermined temperature interval. The arrangement also comprises a precipitate remover arranged for removing crystals of precipitated mono-ammonium phosphate and/or di-ammonium phosphate from the mixing volume.

Preferably, the phosphorus is extracted into the phosphorus-loaded water immiscible liquid phase from solutions by adsorbing phosphorus into a liquid scavenger having affinity for phosphorus, thereby creating the phosphorus-loaded water immiscible liquid phase. The phosphorus is removed by the addition of anhydrous ammonia from the liquid scavenger during regeneration of the scavenger. The temperature of the liquid scavenger is preferably maintained below its boiling point. The regenerated scavenger is preferably continuously recycled in order to extract phosphorus from further feed solutions.

The separated crystalline ammonium phosphates are in one particular embodiment washed with an aqueous solution in which the pH is controlled to a predetermined level. The scavenger initially adhering to the crystals is separated from the dense aqueous phase in a phase separator. The so separated scavenger is continuously recycled in order to extract phosphorus from a feed solution. The aqueous wash solution is also recycled for further washing. In another particular embodiment, the separated crystalline ammonium phosphates are washed with an organic washing solvent in which ammonium phosphates are insoluble and which organic washing solvent has a lower boiling temperature than the scavenger.

The washed ammonium phosphate crystals are thereafter preferably dried. The drying can preferably at least to a part be performed by heat obtained from the heat exchange process cooling the mixing of anhydrous ammonia with phosphoric acid.

The invention provides for extraction of phosphorus from process streams in form of high quality products such as ammonium phosphate fertilizers in an environmentally friendly and cost effective way. The invention enables production of MAP or DAP independent of the initial composition of the precipitated crystals. According to the invention, phosphorus can be recovered as a concentrated, water-soluble, inorganic product of a high quality, i.e. high phosphorus availability to plants and minor heavy metal contamination. Another advantage of the present invention is that it enables to reuse the scavenger without the need for distillating large quantities of liquid scavenger.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
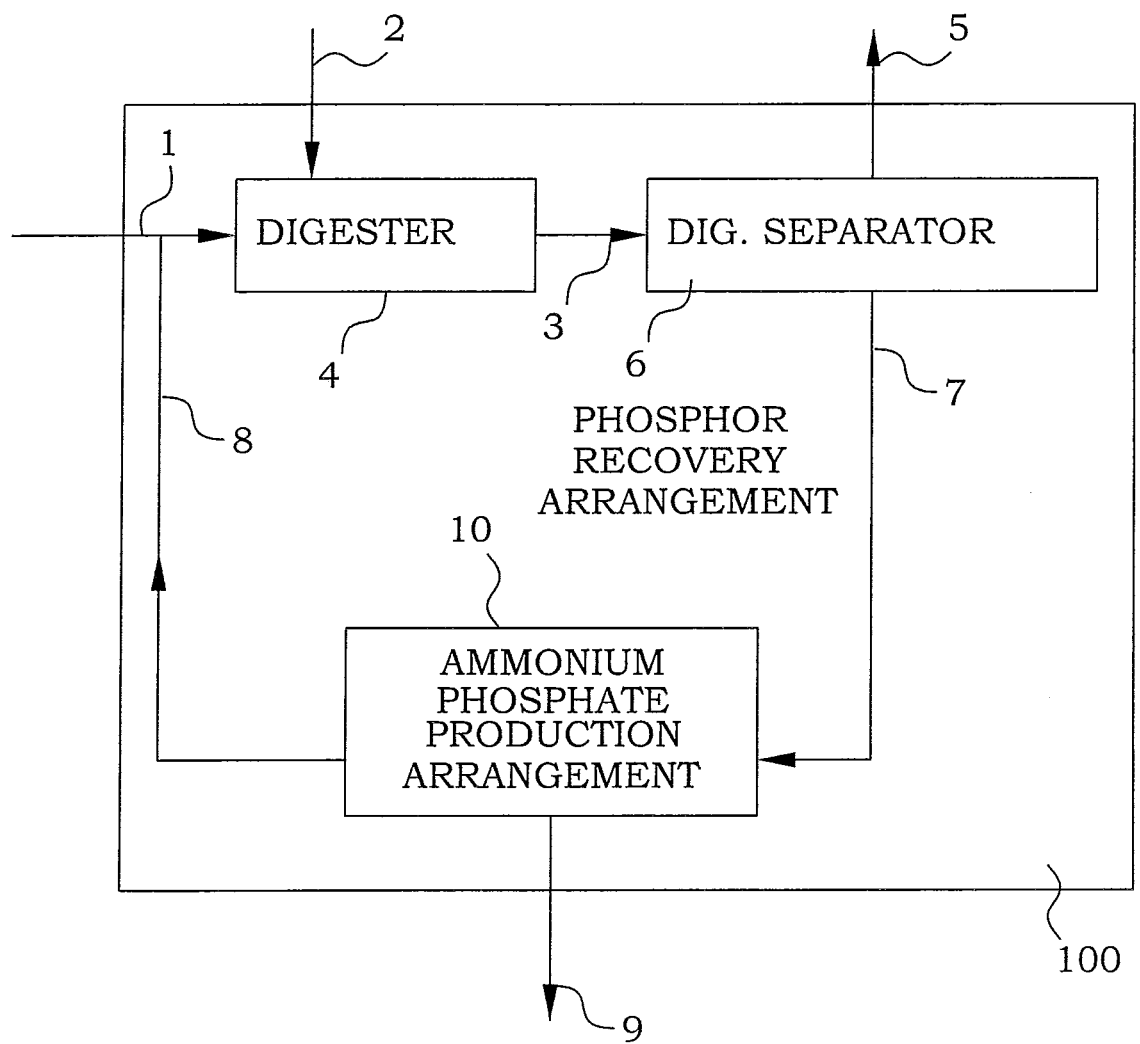
FIG. 1 is a block scheme of an embodiment of an arrangement for recovery phosphorus.

Throughout the drawings, the same reference numbers are used for similar or corresponding elements.

Some often used terminology in the present disclosure is to be interpreted as follows:

Scavenger—material having affinity for solute species, e.g. material adsorbing ions or acids, by ion association or solvation mechanisms. The term comprises different kinds of extractants contained in solvents.

Solvent—A liquid phase, typically organic, which preferentially dissolves extractable solute species from an aqueous solution.

Extractant—An active component, typically organic, of a solvent enabling extraction.

Solvent extraction (liquid liquid extraction)—The separation of one or more solutes from a mixture by mass transfer between immiscible phases in which at least one phase typically is an organic liquid.

Regeneration—The displacement from the scavenger of the ions or acids removed from the process solution to make the scavenger ready for reuse.

Diluent—A liquid, typically organic, in which an extractant is dissolved to form a solvent.

Raffinate—An aqueous phase from which a solute has been removed by extraction.

The main objective of the invention is to provide a simple and cost effective method for production of ammonium phosphates. The method enables production of ammonium phosphates without the need for concentrating phosphoric acid by water evaporation. Furthermore, the method enables production of fully-soluble and pure mono-ammonium phosphate or di-ammonium phosphate salts.

One possible general approach to production of ammonium phosphates from phosphoric acid is to extract phosphoric acid into an organic solvent and use ammonia as a mean to precipitate ammonium phosphates directly from the organic phase. As will be found further below, use of anhydrous liquid ammonia or gaseous anhydrous ammonia turns out to be favorable. Anhydrous liquid ammonia or gaseous anhydrous ammonia was not tested as a mean to precipitate ammonium phosphates directly from an organic phase in the U.S. Pat. No. 3,298,782 the U.S. Pat. No. 3,458,282. One reason for not testing such alternatives may be that there are several major difficulties associated with such general approach such as non sufficient phosphoric acid loading in the organic phase at low phosphoric acid concentrations, problems of heat generation and evaporation of the solvent, loss of expensive solvent adhering to precipitates, difficulties to predict the form of precipitated ammonium phosphate, and difficulties to separate impurities. The difficulties are described in the following text and must be overcome to give a commercially interesting approach.

Solvents used for purification of phosphoric acid such as ketones, tri-alkyl phosphates and alcohols require high concentrations of phosphoric acid in the feed solution in order to obtain a sufficient high phosphoric acid loading in the organic phase for a liquid-liquid extraction process to be practical. The use of such solvents requires concentration of phosphoric acid by water evaporation prior to phosphoric acid extraction.

Even if sufficient high phosphoric acid loading can be achieved in the organic phase, for the liquid-liquid extraction process to be practical, then the reaction of ammonia with concentrated phosphoric acid is known to be highly exothermic which could lead to the evaporation of the solvent. Stripping a solvent, loaded with phosphoric acid, with an aqueous base generate a substantial amount of heat. The problem of such heat generation is described in U.S. Pat. No. 4,112,118, which relates to a process for preparing phosphate salts from phosphoric acid extracted into an organic solvent by stripping with an aqueous base. In order to minimize heat production the mole ratio of base to phosphoric acid had to be reduced to between 0.1:1 and 0.5:1 in order to enable the process to be operational. This emphasizes the problem with heat evolution and evaporation of the solvent when precipitating mono-ammonium phosphate (MAP) or di-ammonium phosphate (DAP) with anhydrous ammonia directly in the organic phase since the ammonia to phosphoric acid mole ratio has to be above 1. It is also difficult to predict the amount of heat generated when reacting anhydrous ammonia and phosphoric acid in a specific solvent mixture since enthalpy data are specific for each solvent mixture and must therefore be determined experimentally.

In addition to the difficulties due to heat generation and evaporation of the solvent, large amounts of solvent are expected to remain adhering to the precipitated ammonium phosphate crystals and the loss of expensive solvent mixture would be economically unacceptable, at least in some applications. Removal of adhering solvent by distillation is difficult since the boiling point for solvents such as tributyl phosphate (289° C.) exceeds the melting point for mono-ammonium phosphate (190° C.). Furthermore, the process must be controlled to produce stable ammonium phosphate salts such as mono-ammonium phosphates or di-ammonium phosphates, which are the desired end products. Finally, methods for removal of impurities such as metals, silica, fluorine, etc. must be identified in order for such a process to be applicable.

All the now identified above mentioned difficulties led to that the above mentioned general approach was not tested and not implemented in the industry prior to the present invention.

Here below, an embodiment of a process for producing ammonium phosphates from a phosphorus-containing mineral according to the present invention is described in details in connection with FIG. 1. However, although being an advantageous approach, the present invention is not limited to recovery of phosphorus from minerals, but is applicable to many different systems providing phosphate ions/phosphoric acid. A similar process with minor modifications can be used e.g. for extracting phosphorus from ash of incinerated sewage sludge, ash of incinerated animal by-products, P rich streams within sewage treatment works, industrial effluents, etc.

An embodiment of an arrangement 100 for recovery phosphorus is shown in FIG. 1. Apatite concentrate 2 obtained by the beneficiation of mined phosphate rock is subjected to digestion with sulfuric acid 1 in a digester 4 according to known methods giving digested apatite 3. Known process schemes include di-hydrate, hemi-hydrate, hemihydrate-dihydrate, and dihydrate-hemihydrate processes. Calcium sulfate (gypsum) 5 and a phosphorous-containing aqueous solution 7, in this embodiment phosphoric acid, are thereafter separated by filtration in a digester separator 6. The filter-grade phosphoric acid 7 is optionally pretreated to remove impurities by known methods. The entire arrangement for digestion of apatite 4 and separation of impurities 6 can be seen as a pretreatment for providing a feed solution to a liquid-liquid extraction process, i.e. a phosphorus-containing aqueous solution 7. The feed solution is provided to an arrangement 10 for production of ammonium phosphates, in this embodiment provided by liquid-liquid extraction. Liquid-liquid extraction involves selective transfer of solute between two immiscible phases, an aqueous phase and an organic phase. The two immiscible phases are first thoroughly mixed in order to facilitate the transfer of solute and then separated.

In order to recover phosphate from phosphorus-containing aqueous solution 7, a liquid-liquid extraction process is utilized, where a feed aqueous solution containing phosphate ions/phosphoric acid is exposed to an organic phase (hereby named scavenger). The phosphate ions/phosphoric acid are thereby extracted into the scavenger. This is described more in detail further below. In general terms, the arrangement 10 for production of ammonium phosphates derives ammonium phosphate 9 from the phosphorus-containing aqueous solution 7, giving a remaining process liquid 8, which preferably can be reused together with the sulfuric acid 1 for further digestion.

Figure 2:
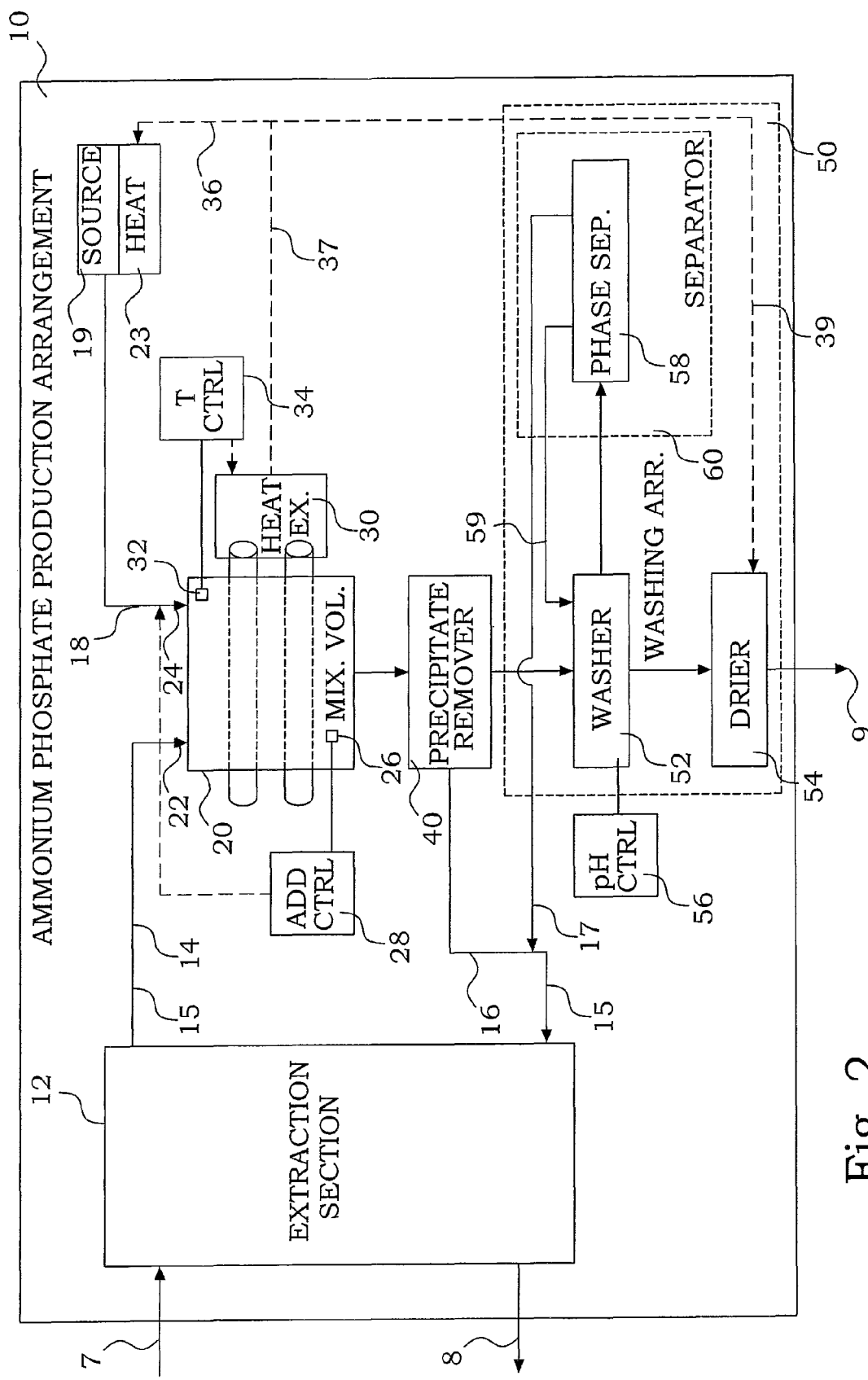
FIG. 2 is a block scheme of an embodiment of an arrangement for production of ammonium phosphates according to the present invention.

An embodiment of an arrangement 10 for production of ammonium phosphates is illustrated more in detail in FIG. 2. An extraction section 12 is arranged for allowing adsorbing of phosphorous from a phosphorous-containing aqueous solution 7 into a liquid scavenger 15 having affinity for phosphorous. An aqueous solution depleted in phosphorous leaves the extraction section 12. When used in conjunction with the arrangement 100 for recovery phosphorus shown in FIG. 1 the phosphorus depleted aqueous solution becomes the remaining process liquid 8. An outlet from the extraction section 12 for scavenger 15 loaded with phosphorous is connected to an inlet 22 for a phosphorus-loaded water immiscible liquid phase of a mixing volume 20, whereby the scavenger 15 loaded with phosphorous forms a phosphorus-loaded water immiscible liquid phase 14. As also will be discussed further below, an inlet for scavenger 15 depleted from phosphorous 16 to the extraction section 12 is connected, at least indirectly, to the mixing volume 20. This inlet for scavenger 15 depleted from phosphorous 16 is thus arranged for reusing regenerated scavenger 15 formed in the mixing volume 20 for further adsorbing of phosphorous in the extraction section 12.

Any organic solvent (scavenger) capable of removing phosphorus from aqueous solutions can be used in the liquid-liquid extraction of the extraction section. The mechanism of phosphorus extraction can be ion association, solvation of phosphoric acid or both. The composition of the scavenger should be selected according to the concentration of the phosphoric acid feed, presence of additional acids or salts, etc. in order to obtain a high loading capacity and an effective operational extraction process.

Processing dilute phosphoric acid streams requires the use of scavengers with a strong extraction power for phosphate. Liquid scavengers suitable for extracting phosphoric acid from dilute solutions are liquid amines. In general, primary, secondary and tertiary liquid amines can be used. Amine extractants have a low water-solubility, good miscibility with organic solvents, good chemical stability, high selectivity and a strong binding power enabling acid extraction from very dilute solutions. Preferably, amines should be selected having a nitrogen atom attached to a large organic molecule containing more than seven aliphatic or aromatic carbon atoms. Such organic amines are highly soluble in organic solvents and almost insoluble in water. In contact with an acid containing solution, the amine base reacts with the acid to form a protonated positive charge, which associates with the anion of the acid. Organic amines can extract more acid than the stoichiometric ratio of 1 acid molecule per 1 molecule of amine through solvation of additional neutral acid molecules. In concentrated phosphoric acid, up to four phosphate molecules are extracted per molecule of liquid amine. High concentration of amines can polymerize to form a third, non-wanted, separate phase. However, the formation of the non-wanted third phase can be avoided by dissolving the amines in another organic solvent which is a strong Lewis base such as tributyl phosphate or alcohols. Mixtures of solvating extractants such as tri butyl phosphate and liquid amines are preferably used together to efficiently extract phosphate at both high and low concentrations.

Solvating extractants are liquid organic molecules containing oxygen atoms (alcohols, esters, ethers, ketons, trialkyl phosphates, amides, etc.) which interact with phosphoric acid to form H-associations. During this mechanism, the extractant replaces part of the water molecules and solvates the phosphoric acid molecule in the organic phase. The binding of phosphoric acid is weak through H-association. Solvating extractants can be divided into two groups: a) solvents that have a reasonably constant distribution coefficient down to fairly low concentrations such as alcohols, tributyl phosphate, etc., and b) solvents which show very little extraction capacity for phosphoric acid below a specific threshold concentration, i.e., the distribution coefficient is very sharply concentration dependent such as for ethers, esters and selected ketones e.g. methyl isobutyl ketone. For processing of filter-grade phosphoric acid it is preferred to use mixtures of solvents that have a reasonably constant distribution coefficient down to fairly low concentrations such as tributyl phosphate and liquid amines which have a strong extraction power for phosphate even at very low concentrations due to an ion association mechanism.

By extracting phosphoric acid with two mechanisms coupled to each other, i.e., phosphate adsorption by ion association and solvation of neutral phosphoric acid, mixtures of solvating extractants such as tributyl phosphate and liquid amines such as trioctyl amine are effective scavengers both for highly concentrated as well as highly diluted phosphoric acid streams. The distribution coefficients involved in acid extraction by such scavengers are high, which means that the number of contact stages necessary, is low. The organic to aqueous volume ratio for extracting phosphoric acid from filter-grade phosphoric acid having a concentration of 5M can be below 10:1 and preferably below 5:1. The obtained phosphate concentration in the scavenger is preferably above 1M. In addition, mixture of solvating extractants and liquid amines are selective towards anions and do not bind positively charged metals, which means that metal contaminants are separated from the extracted phosphoric acid by remaining in the aqueous solution.

The filter-grade phosphoric acid is fed to a liquid-liquid extraction process characterized by the above described scavenger. The liquid-liquid extraction process is preferably a continuous liquid-liquid extraction process using preferably liquid-liquid extraction equipment such as pulsed-columns. However, any other liquid-liquid extraction equipment can be used such as, agitated columns, non-agitated columns, mixer settlers, inline mixers, centrifugal contactors, etc.

The raffinate, which is depleted in phosphate, is further treated to remove metal precipitates. It can then be used for apatite dissolution or gypsum washing, (see e.g. FIG. 1).

The scavenger which is loaded with phosphorus is optionally scrubbed to remove co-extracted impurities forming a phosphorus-loaded water immiscible liquid phase.

Returning to FIG. 2, the phosphorus-loaded water immiscible liquid phase 14 is thereafter treated with anhydrous ammonia to form crystalline ammonium phosphate directly in the scavenger. To this end, the arrangement 10 for production of ammonium phosphates comprises a mixing volume 20 having an inlet 22 for the phosphorus-loaded water immiscible liquid phase 14. The mixing volume has furthermore an inlet 24 for adding anhydrous ammonia 18 into the phosphorus-loaded water immiscible liquid phase 14. Anhydrous liquid ammonia or gaseous anhydrous ammonia can be utilized.

In order to form a solid ammonium phosphate crystal, several ammonia molecules react with several phosphoric acid or hydrogen phosphate molecules to form a crystal structure by H-bonding of ammonium molecules to phosphate molecules. The weak bonds easily dissociate in contact with water, which makes ammonium phosphate crystals highly water-soluble. It is known that several crystalline ammonium phosphate solid phases can be obtained by contacting ammonia, phosphoric acid and water at different concentrations and temperatures. The following crystalline solid phases are known: $(NH_4)_7H_2(PO_4)_3$, $(NH_4)_3PO_4$, $(NH_4)_3PO_4.2H_2O$, $(NH_4)_3PO_4.3H_2O$, $(NH_4)HPO_4.H_2O_2$, $(NH_4)_2HPO_4$, $(NH_4)_2HPO_4.2H_2O$, $NH_4H_2PO_4$, $(NH_4)_3H_2(PO_4)_4$, $NH_4H_5(PO_4)_2.H_2O$, and $NH_2$), and $NH_4H_5(PO_4)_2$. Several of these crystalline ammonium phosphates are unstable at ambient temperature and atmospheric pressure resulting in the decomposition of the crystal into another structure accompanied with release of ammonia. Such unstable crystalline solid phases are not suitable for use in agriculture.

It is known that perfectly dry ammonia will not combine with perfectly dry hydrogen chloride to form the ammonium salt. Moisture is thus necessary to bring about the reaction. Extraction of phosphoric acid with scavengers such as tributyl phosphate is accompanied with co-extraction of water molecules. The mole ratio of co-extracted water to tributyl phosphate varies between 0.7 to 1.7 $[H_2O]_{org}/[TBP]_{org}$ depending on the concentration of phosphoric acid in the scavenger and the temperature.

It has, however, surprisingly been found that by reacting anhydrous ammonia with phosphoric acid or phosphate molecules in organic scavengers (e.g. tributyl phosphate, mixtures of tributyl phosphate and alcohols, mixtures of tributyl phosphate and amines), the crystalline solid phase obtained has an ammonium to phosphate mole ratio which is about 1 and the crystals are stable at ambient temperature and atmospheric pressure. The crystalline solid phase was found to be composed primarily of mono-ammonium phosphate (MAP) $NH_4H_2PO_4$. A minor fraction of di-ammonium phosphate (DAP) $(NH_4)_2HPO_4$ was also present. Thus crystalline solid ammonium phosphates, surprisingly produced by contacting anhydrous ammonia with phosphate in the above described scavengers, can be used directly for agricultural purposes.

The precipitation of phosphorus from the above described organic solvents was found to be highly effective enabling phosphorus removal efficiency above 99%. The high stripping efficiency enables high operational capacity during extraction of phosphoric acid. In contrast to stripping with water, which is based on an equilibrium reaction leading to incomplete phosphorus stripping, the reaction of phosphorus with ammonia is not based on equilibrium and phosphorus stripping is complete.

It is known that anhydrous ammonia is soluble in different organic solvents such as ethanol (10% by weight at 25° C.), methanol (16% by weight at 25° C.), etc. However, the solubility of ammonia in tributyl phosphate is only 0.6% by weight at 20° C. and the solubility decreases with increasing temperatures. Above 35° C. the solubility of ammonia in tributyl phosphate is insignificant. Thus, the amount of residual ammonia in the scavenger after precipitation of phosphorus is very low. It was also found that there is a correlation between phosphorus loading in the organic solvent to pH and conductivity. Conductivity decreases and pH level increases with decreasing concentration of phosphoric acid in the solvent. Addition of ammonia can thereby be controlled by monitoring the conductivity and/or pH of the scavenger to enable operation without excess ammonia. To this end, again referring to FIG. 2, the arrangement 10 for production of ammonium phosphates comprises a sensor 26, in this embodiment a sensor for monitoring of a conductivity of the water immiscible liquid phase, in the mixing volume 20. The arrangement 10 for production of ammonium phosphates further comprises an adder control unit 28 connected to the sensor 26 and arranged for controlling an amount of added anhydrous ammonia 18 in response to the monitored conductivity. In an alternative embodiment, the sensor 26 is a sensor for monitoring of a pH of the water immiscible liquid phase in the mixing volume 20, and the adder control unit 28 is consequently arranged for controlling an amount of added anhydrous ammonia 18 in response to the monitored pH.

Reaction of ammonia with phosphoric acid is as mentioned above highly exothermic and a substantial amount of heat is expected to be produced during this reaction. However, it was surprisingly found that the heat generated when neutralizing a solvent loaded with 1.42 M $H_3PO_4$ (~50° C. liter$^{-1}$ solvent) is lower than required for vaporizing of the scavenger can therefore in a practical manner be controlled by heat-exchanging to a temperature within a desired interval. The arrangement 10 for production of ammonium phosphates comprises a heat exchanger 30 arranged in thermal contact with the water immiscible liquid phase 15. In the embodiment of FIG. 2, the heat exchanger 30 is arranged in the mixing volume 20 for extracting heat from the water immiscible liquid phase 15 within the mixing volume 20. The temperature in the mixing volume 20 where the scavenger 15 and ammonia 18 is mixed is preferably measured by a thermometer 32 and this measure is used by a controller 34 for operating the heat exchange in such a way that the temperature of the water immiscible liquid phase 15 in the mixing volume 20 is held within a predetermined temperature interval. Preferably, the scavenger to be used in the extraction section 12 is cooled to a temperature which is below 60° C. since lower temperatures favor phosphoric acid extraction by the scavenger 15.

In one particular embodiment, the cooling of the heat exchanger 30 can be achieved by vaporizing liquid anhydrous ammonia into a gaseous form. In such a manner cooling can be obtained by using ammonia which is an ingredient in the final product. This is indicated in FIG. 2 by the broken arrows 36 and 37. To that end, the arrangement 10 for production of ammonium phosphates comprises a source of liquid ammonia 19. A heater unit 23 is connected to the source of liquid ammonia 19 and is connected to or integrated with the heat exchanger 30. The heater unit 23 is arranged for utilizing at least a part of heat extracted in the heat exchanger 30 to produce gaseous ammonia, used as the anhydrous ammonia 18. This means that the inlet 24 for adding anhydrous ammonia 18 of the mixing volume 20 is connected for extracting the gaseous ammonia from the source of liquid ammonia 19.

Alternatively, cooling can be achieved by any other means such as heat exchange with cooling water. This alternative is preferable when it is desired to recover the generated heat for use in other processes or used for drying the recovered ammonium phosphate crystals, which will be discussed further below.

The crystalline solid ammonium phosphates are thereafter separated from the scavenger by known solid-liquid separation techniques such as filtration, decantation, centrifugation, etc. In FIG. 2, a precipitate remover 40 is arranged for removing crystals of precipitated mono-ammonium phosphate and/or di-ammonium phosphate from the mixing volume 20. The phosphorus-depleted scavenger 16 is then preferably continuously recycled in order to again extract phosphate from a feed solution in the extraction section 12.

Relatively large amounts of scavenger remain adhering to the separated ammonium phosphate crystals. These amounts are typically large enough that a loss of expensive solvent mixture generally would be economically unacceptable. It is therefore preferable to also recycle these amounts of scavenger. In the embodiment of FIG. 2, the arrangement 10 for production of ammonium phosphates comprises washing arrangement 50, in turn comprising a washer 52 connected to the precipitate remover 40. The washer 52 is arranged for washing the separated ammonium phosphate crystals. A drier 54 is connected to the washer 52 and is arranged for drying the washed crystals. A separator 60 is connected to the washer 52 and is arranged for separating residual scavenger 17 washed from the crystals. The separator 60 is thereby connected to the inlet to the extraction section 12 for scavenger depleted from phosphorous 16 for reusing the separated residual scavenger 17 for further adsorbing of phosphorous in the extraction section 12. The separator is also arranged for providing washing liquid depleted from residual scavenger 59 for reuse for washing crystals in the washer 52.

According to one embodiment of the present invention, the scavenger adhering to the separated ammonium phosphate crystals is removed by washing the ammonium phosphate crystals with a saturated aqueous ammonium phosphate solution. The scavenger initially adhering to the crystals forms a separate phase which typically is lighter than the dense aqueous phase and is as mentioned further above water immiscible. The two phases are thereby spontaneously separated from each other. The separator 60 of the present embodiment therefore is a phase separator arranged for separation of the scavenger and said saturated aqueous solution of ammonium phosphate. It was surprisingly found that the above mentioned wash procedure is highly efficient. The carbon content of the washed ammonium phosphate crystals was found to be lower than carbon contents of commercial high-purity ammonium phosphate salts. It is believed that the washing with saturated ammonium phosphate solution is a dynamic process in which ammonium phosphate crystals constantly dissolve and re-crystallize enabling efficient removal of adhering solvent. The operation of the wash procedure is simple and is not energy intensive. The saturated ammonium phosphate solution which is separated from the crystals is continuously recycled for further washing. Make up of saturated ammonium phosphate solution is made by dissolving produced ammonium phosphate salts in aqueous solutions such as water, phosphoric acid, or other acid/salt solutions. As mentioned also before, the separated water-immiscible scavenger is continuously recycled in order to extract phosphate from a feed solution.

The washed ammonium phosphate crystals are thereafter dried in the drier 54. The drying can preferably at least to a part be performed by heat obtained from the heat exchange process cooling the mixing of anhydrous ammonia with phosphoric acid. To that end the drier 54 is connected to the heat exchanger 30 as indicated by the broken arrows 37 and 39.

The drier 54 is thereby arranged for utilizing at least a part of the heat extracted in the heat exchanger 30 for drying the washed crystals.

The produced ammonium phosphates are fully water-soluble, metal depleted and can be used for agricultural purposes such as fertilization or fertigation.

Another important advantage of the wash process according to a preferred embodiment of the present invention is that it enables to control the production of ammonium phosphates to produce either MAP or DAP independent of the initial composition of the precipitated crystals. If MAP is the desired end product, then the wash solution used is preferably composed of saturated aqueous solution of mono-ammonium phosphate. The pH of the slurry is controlled and adjusted to a value between 2 and 6, preferably between 3 and 5 and most preferably of about 4.1 by addition of e.g. phosphoric acid or ammonia. This procedure results in production of MAP independent of the initial composition of the precipitated crystals. In a similar way if DAP is the desired end product then the wash solution used is composed of saturated aqueous solution of di-ammonium phosphate. The pH of the slurry is controlled and adjusted to a value between 6 and 10, preferably between 7 and 9 and most preferably of about 8.3 by addition of e.g. ammonia. This procedure results in production of DAP independent of the initial composition of the precipitated crystals. In such a manner, production of both MAP and DAP is possible according to the invention. To this end, the washer 52 is further arranged for controlling a pH of the saturated aqueous solution of mono-ammonium phosphate and/or di-ammonium phosphate.

Figure 3:
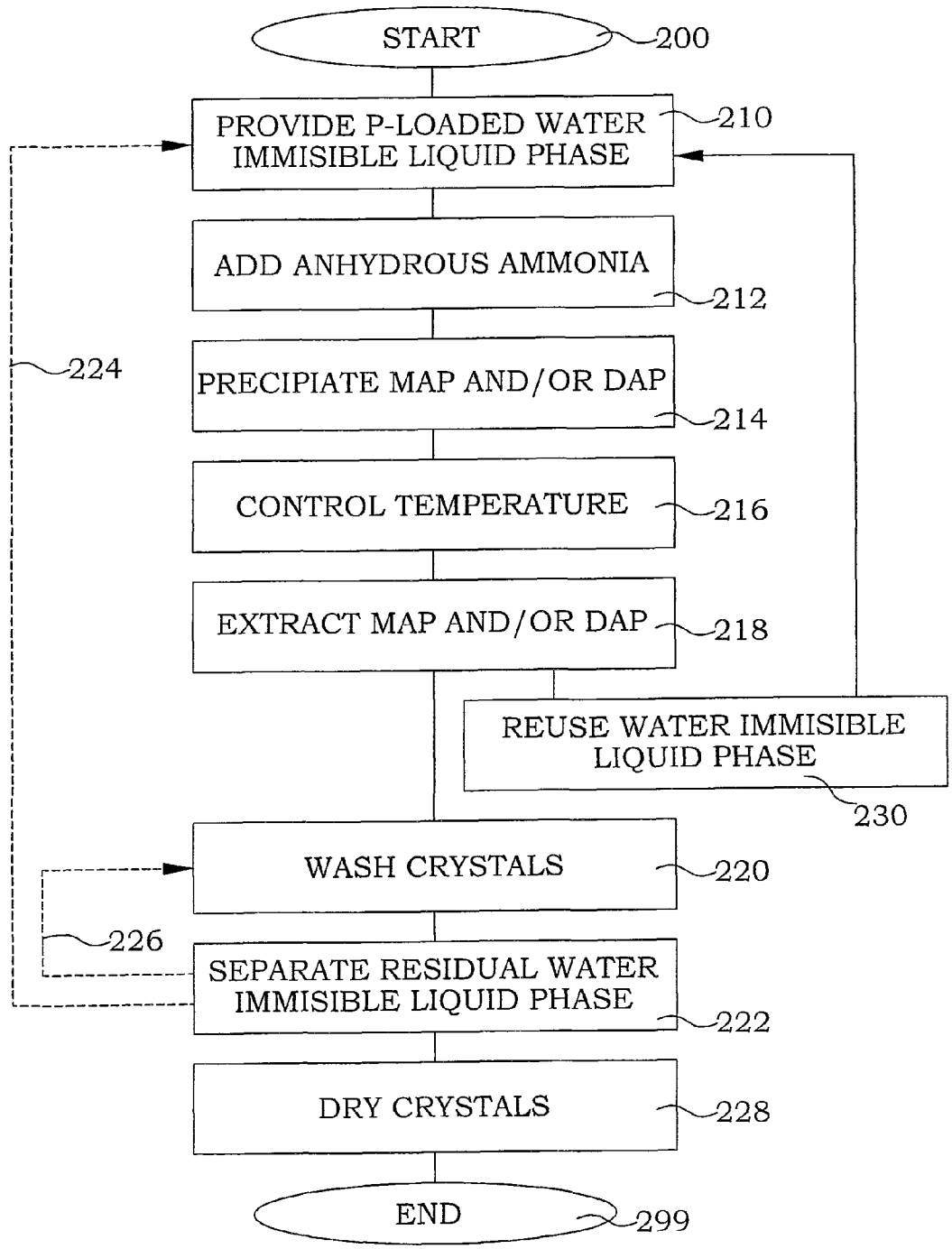
FIG. 3 is a flow diagram of an embodiment of a method according to the present invention.

FIG. 3 illustrates a flow diagram of steps of a method according to an embodiment of the present invention. A method for production of ammonium phosphates begins in step 200. In step 210, a phosphorus-loaded water immiscible liquid phase is provided. Anhydrous ammonia is added to the water immiscible liquid phase in step 212. In one particular embodiment, the step 212 of adding comprises monitoring of a conductivity of the water immiscible liquid phase and controlling an amount of added anhydrous ammonia in response to the monitored conductivity. In another particular embodiment, the step 212 of adding comprises monitoring of a pH of the water immiscible liquid phase and controlling an amount of added anhydrous ammonia in response to the monitored pH. Mono-ammonium phosphate and/or di-ammonium phosphate is in step 214 precipitated from the water immiscible liquid phase. In step 216, a temperature of the water immiscible liquid phase during the steps of adding and precipitating is controlled to be situated within a predetermined temperature interval. As will be discussed more in detail further below, the actual step of controlling can be performed before, during and/or after the steps of adding and precipitating. The important feature is that it is ensured that the temperature during the adding and precipitating is kept within predetermined limits. It is of less importance when the actual instant of heat removal occurs. Step 216 may therefore be situated in time before, concurrent with and/or after the steps 212 and 214. The temperature controlling typically comprises extraction of heat from the water immiscible liquid phase. This heat may, at least to a part, be used for producing gaseous ammonia from liquid ammonia by means of heating. This gaseous ammonia can be used as the anhydrous ammonia added in step 212. In step 218 the precipitated mono-ammonium phosphate and/or di-ammonium phosphate is extracted from the water immiscible liquid phase.

In the embodiment illustrated in FIG. 3, the method further comprises a step 220, in which crystals of extracted precipitated mono-ammonium phosphate and/or di-ammonium phosphate is washed. In step 222, residual water immiscible liquid phase, i.e. typically scavenger (as discussed here below), washed from the crystals is separated. The separated residual scavenger is preferably reused for further adsorbing of phosphorous to obtain the phosphorus-loaded water immiscible liquid phase as indicated by the broken arrow 224. Similarly, washing liquid depleted from residual scavenger is reused for further washing of the crystals as indicated by the broken arrow 226. In this particular embodiment, the washing is performed with saturated aqueous solution of ammonium phosphate and the separating of residual scavenger is performed by phase separation of the scavenger and the saturated aqueous solution of ammonium phosphate. The washed crystals are dried in step 228. Preferably, the drying utilizes at least a part of the heat extracted from the step of controlling the temperature.

In a preferred embodiment, the pH of the saturated aqueous solution of mono-ammonium phosphate and/or di-ammonium phosphate is controlled to drive the chemical reactions to production of particular compositions of MAP and/or DAP. In particular, pure MAP can be obtained by acid pH and pure DAP can be obtained by slightly basic pH, as discussed above.

In the embodiment of FIG. 3, the step 210, providing a phosphorus-loaded water immiscible liquid phase in turn comprises adsorption of phosphorous from a phosphorous-containing aqueous solution into a liquid scavenger having affinity for phosphorous. This means that the scavenger loaded with phosphorous forms the phosphorus-loaded water immiscible liquid phase. The method according to the embodiment of FIG. 3 then also comprises the further step 230 of reusing regenerated scavenger formed by the step of extracting 218 for further adsorbing of phosphorous in step 210. The procedure ends in step 299.

Figure 4:
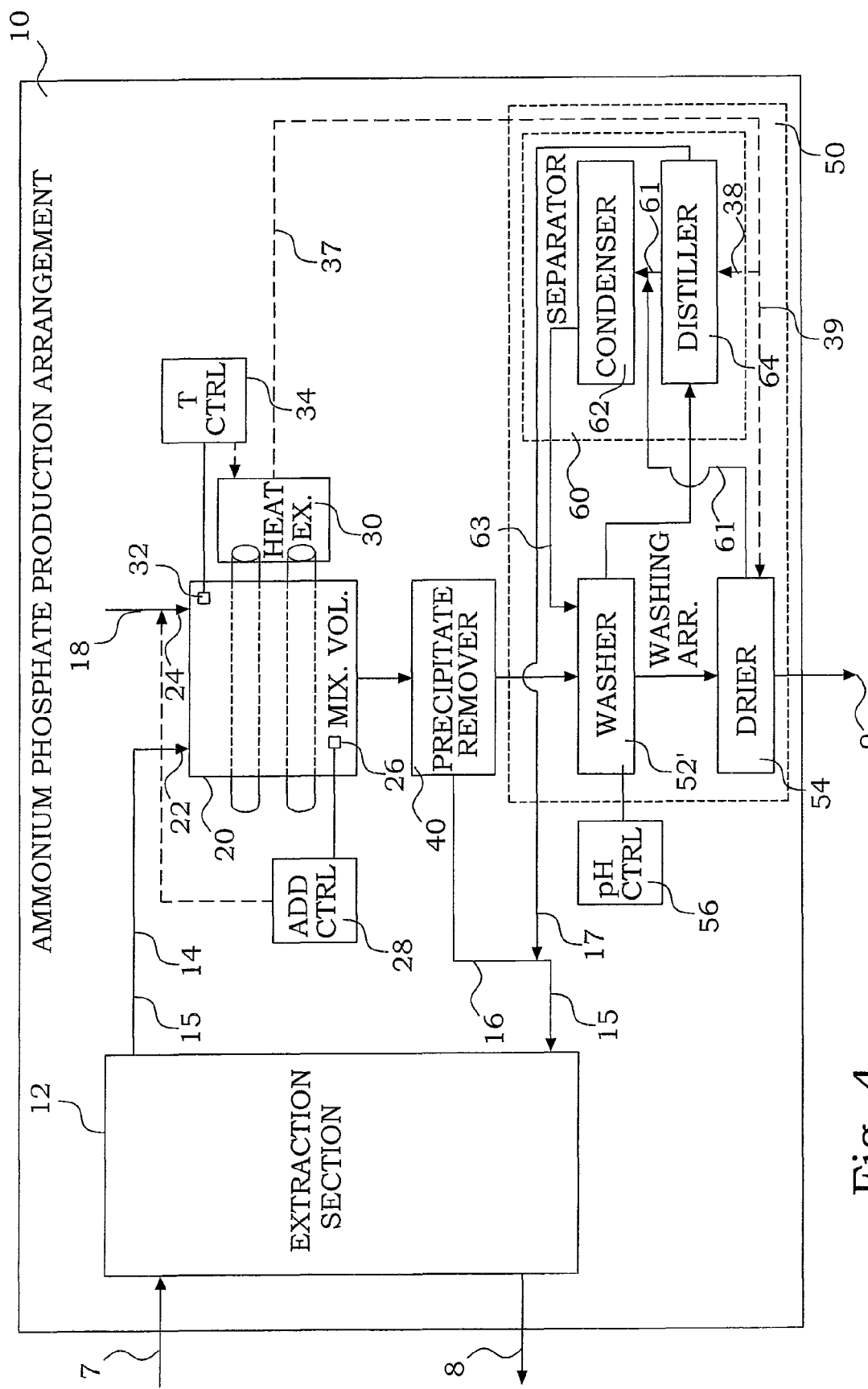
FIGS. 4-6 are block schemes of other embodiments of an arrangement for production of ammonium phosphates according to the present invention.

There are alternative approaches for the crystal washing. The adhering scavenger can be removed from the crystals by washing with an organic solvent having a boiling point which is considerably lower than the boiling point of the scavenger and in which crystalline ammonium phosphates are insoluble. The organic solvent used for washing can be fully-miscible with water. Examples of possible solvents for washing ammonium phosphate crystals include acetone (boiling point of 56.5° C.), methanol (boiling point of 64.7° C.), etc. The recovered crystalline ammonium phosphates can be treated to remove remains of wash solvent by distillation. The obtained wash solution can be collected and the organic solvent, used for washing, can be separated from the scavenger by distillation. Such an embodiment is illustrated in FIG. 4. The washer 52' is here arranged for washing the crystals with an organic washing solvent in which ammonium phosphates are insoluble. The separator 60 comprises a distiller 64 separating the washing solvent 61 in gas phase from the residual scavenger 17 still appearing as a liquid. The heat extracted from the mixing volume 20 may preferably also be used as at least a part of the required heat source for the distilling operation, as indicated by the arrows 37 and 38. The gaseous washing solvent 61 is condensed in a condenser 62. From the drier 54, gaseous washing solvent is also produced, which preferably also is connected back to the condenser for further reutilisation. However, as a minor drawback, it was found that the washing of the crystals with an organic solvent requires careful considerations regarding flow and amount of washing solvent. The volume of wash solvent required for washing may be relatively large. Furthermore, the process is somewhat more complex than the previous presented one, requiring more energy for separating the organic wash solvent from the organic scavenger by the distillation. Presently, the embodiment of using saturated aqueous solution of mono-ammonium phosphate and/or di-ammonium phosphate is considered to be preferred.

Figure 5:
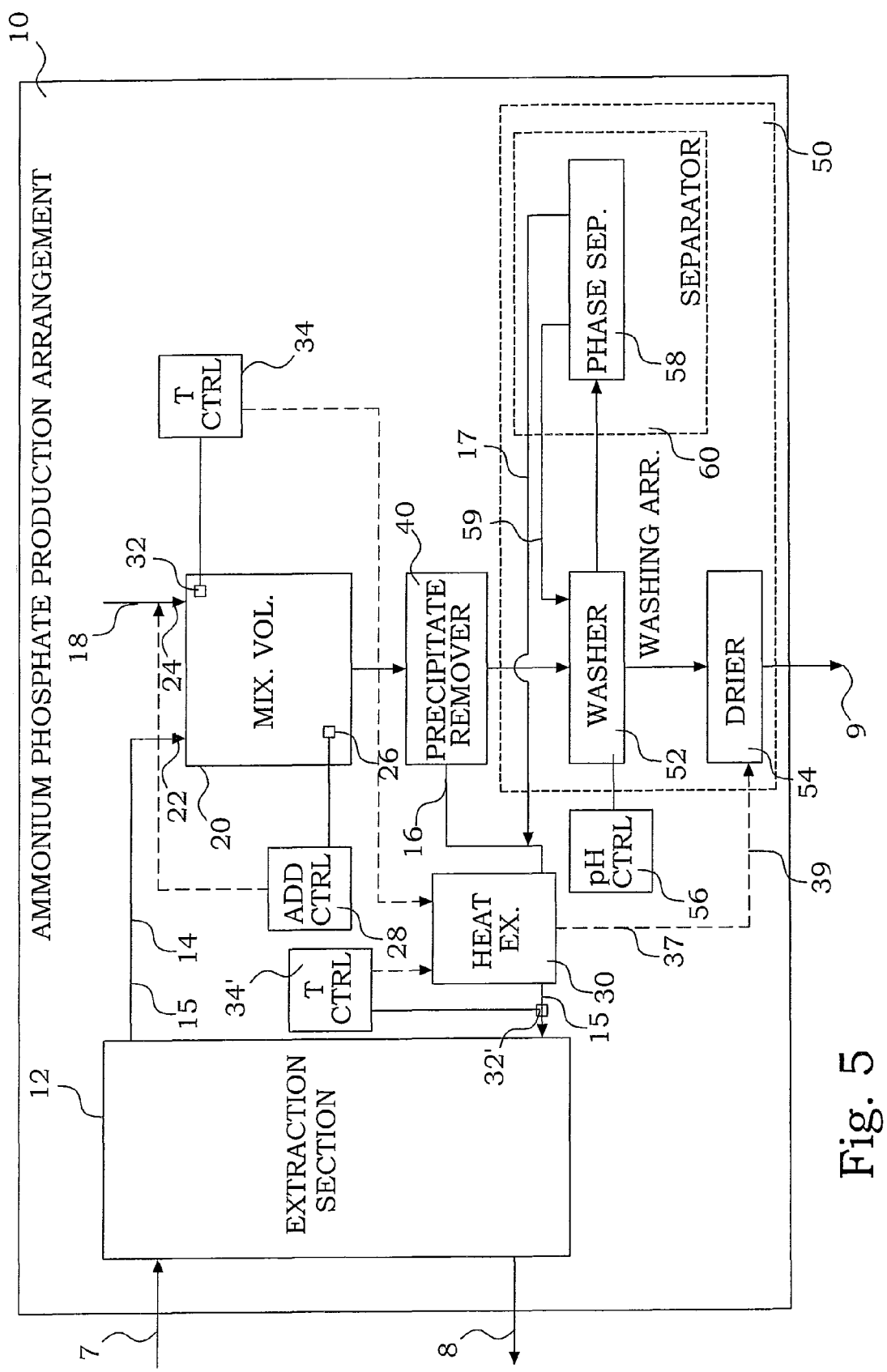

As briefly mentioned above, the actual extraction of heat from said phosphorous-loaded water immiscible liquid phase can be performed in different ways. In the embodiments of FIG. 2 and FIG. 4, the heat exchanger 30 is integrated in the mixing volume 20. This is presently believed to be the preferred way, since it gives a well controlled temperature. However, alternatives are also possible. In FIG. 5, an embodiment is illustrated, where the heat exchanger 30 is arranged in contact with the water immiscible liquid phase leaving the precipitate remover 40. The controller 34 may still be controlled based on the temperature in the mixing volume 20 as measured by a thermometer 32. Alternatively, or in addition, a controller 34' be operated based on the temperature of the scavenger entering the extraction section 12 by means of a thermometer 32'. In this way, the temperature of the scavenger entering the extraction section 12 is primarily controlled, which in turn will keep the temperature of the phosphorous-loaded water immiscible liquid phase within the mixing volume in the next cycle within the requested temperature interval, in particular if there is information about the assumed phosphorus content leaving the extraction section 12 with the phosphorous-loaded water immiscible liquid phase. In other word, by controlling the temperature of the scavenger entering the extraction section 12, an indirect control of the temperature in the mixing volume will also be achieved. This can be a good alternative in arrangements, where the initial phosphorous content is relatively stable or at least predictable. The scavenger entering the extraction section 12 may then be optimized in temperature regarding phosphorous affinity.

Figure 6:
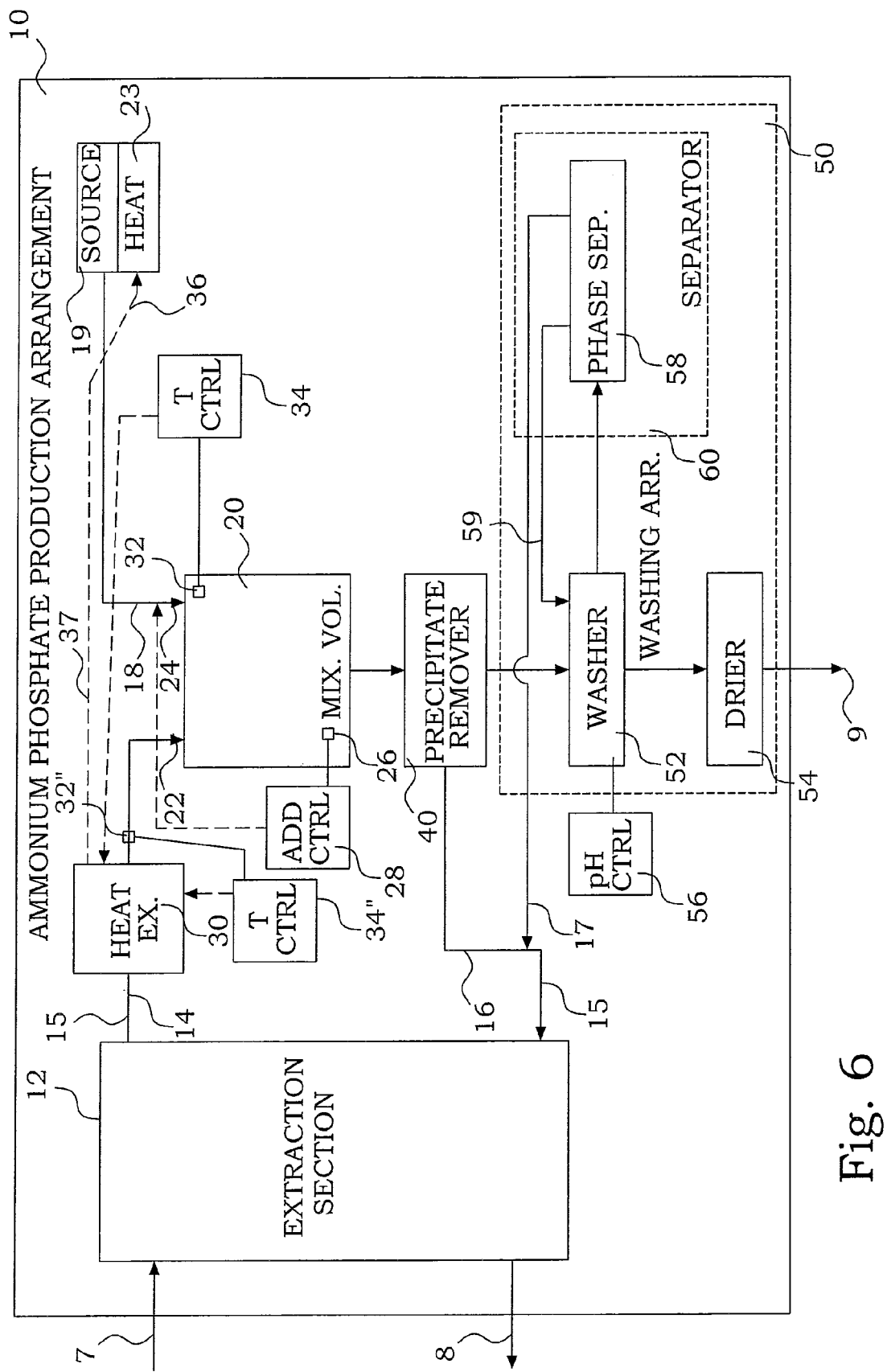

In FIG. 6, yet another embodiment is illustrated, where the heat exchanger 30 is arranged in contact with the water immiscible liquid phase leaving the extraction section 12 before entering the mixing volume 20. Here, the control can be based on either or both of a temperature in the mixing volume or a temperature of the loaded scavenger before entering the mixing volume 20. The temperature in the scavenger before entering the mixing volume is then measured by a thermometer 32" and using a controller 34". In this way, the temperature of the loaded scavenger is reduced, and the expected exothermic reactions in the mixing volume 20 will bring the water immiscible liquid phase to the predetermined temperature interval. This embodiment can be advantageous in applications where there are difficulties in combining the ammonia adding and precipitating with en efficient heat extraction.

The detailed embodiments above are only a few examples of how a method and an arrangement for production of ammonium phosphates may be arranged. The phosphorus-containing water immiscible liquid phase is preferably provided as described further above, but there are also other possibilities. The phosphorus-containing water immiscible liquid phase could be provided by any type of ion exchange process. The phosphorus-containing liquid phase could also be provided by other chemical processes, such as dissolution from solid phases. Likewise, the post-treatment of the precipitated MAP and/or DAP is also just one example, presently preferred, of how the MAP and/or DAP can be managed. Other more conventional techniques such as direct distilling of the precipitate in order to evaporate the scavenger or other solvent directly without any washing step. Furthermore, in certain applications, where the scavenger or other solvent is not very expensive and is harmless as impurity in the produced MAP/DAP, one may completely remove the washing procedure.

Tests have been performed on different systems in order to illustrate and verify the advantages obtained by methods and arrangements according to the principles described above. Some examples are presented here below.

EXAMPLE 1

An organic solvent composed of 80% tributyl phosphate and 20% heptanol by volume, having a pH value of 5.9, was loaded with 1.42 M $H_3PO_4$ by exposing the organic solvent to aqueous phosphoric acid. The two immiscible phases were first thoroughly mixed in order to facilitate the transfer of phosphoric acid and then separated. The loaded organic solvent having a pH value of −0.4 was contacted with an excess of liquid anhydrous ammonia (>50 g $NH_3$ liter$^{-1}$ solvent). Crystalline solids formed in the organic phase. The solids were separated from the organic solvent by centrifugation and decantation. The separated solids were washed several times with methanol and dried for 2 hours at 90° C. The recovered inorganic salt was composed of 12.3% N and 26.8% P corresponding to 98% $NH_4H_2PO_4$ and 2% $(NH_4)_2HPO_4$ by weight. The removal efficiency of phosphorus from the organic solvent was found to be as high as 99.4%.

EXAMPLE 2

The same experiment as described in example 1 was repeated with an organic solvent composed of 80% tributyl phosphate and 20% tri-octyl/decyl amine by volume. The recovered inorganic salt was composed of 13% N and 26.6% P corresponding to 90% $NH_4H_2PO_4$ and 10% $(NH_4)_2HPO_4$ by weight.

EXAMPLE 3

The same experiment as described in example 1 was repeated, the only difference being the use of a limited amount of liquid anhydrous ammonia (<20 g $NH_3$ liter$^{-1}$ solvent). The recovered inorganic salt was composed of 12.2% N and 26.9% P corresponding to 99% $NH_4H_2PO_4$ and 1% $(NH_4)_2HPO_4$ by weight.

EXAMPLE 4

The same experiment as described in example 3 was repeated, the only difference being the use of an organic solvent composed of 80% tributyl phosphate and 20% tri-octyl/decyl amine by volume. The recovered inorganic salt was composed of 12.4% N and 26.8% P corresponding to 97% $NH_4H_2PO_4$ and 3% $(NH_4)_2HPO_4$ by weight.

EXAMPLE 5

Measured amounts of liquid anhydrous ammonia were added to a solvent composed of 80% tributyl phosphate and 20% heptanol, loaded with 1.42 M $H_3PO_4$. The pH and conductivity of the solvent (22° C.) as a function of amounts of added ammonia are shown in the following table 1:

TABLE 1 pH and conductivity of the solvent (22° C.) as a
function of amounts of added ammonia of example 5.

| Added ammonia (g NH$_3$ liter$^{-1}$ solvent) | pH | Conductivity (mS/cm) |
|---|---|---|
| 0 | −0.40 | 1.18 |
| 1 | 0.54 | 0.74 |
| 2.7 | 0.62 | 0.50 |
| 5.7 | 0.70 | 0.23 |
| 8.9 | 0.78 | 0.14 |
| 12 | 0.78 | 0.13 |
| 18.2 | 1.24 | 0.05 |
| 21 | 3.32 | |
| 23.3 | 4.9 | 0.02 |
| 25 | 7.6 | 0.01 |

EXAMPLE 6

The same experiment as described in example 5 was repeated, the only difference being the use of an organic solvent composed of 80% tributyl phosphate and 20% tri-octyl/decyl amine by volume. The pH and conductivity of the solvent (22° C.) as a function of amounts of added ammonia are shown in the following table 2:

TABLE 2 pH and conductivity of the solvent (22° C.) as a
function of amounts of added ammonia of example 6.

| Added ammonia (g NH$_3$ liter$^{-1}$ solvent) | pH | Conductivity (mS/cm) |
|---|---|---|
| 0 | −0.09 | 3.73 |
| 1.0 | 0.12 | 2.98 |
| 3.0 | 0.55 | 2.76 |
| 4.3 | 0.79 | 2.47 |
| 6.0 | 0.89 | 1.53 |
| 7.3 | 1.27 | 1.47 |
| 9.0 | 2.29 | 1.24 |
| 11.0 | 2.67 | 1.11 |
| 13.0 | 2.78 | |
| 15.3 | 4.62 | 0.56 |
| 24.6 | 7.10 | 0.03 |

EXAMPLE 7

An excess of gaseous anhydrous ammonia was added to a solvent composed of 80% tributyl phosphate and 20% heptanol by volume, loaded with 1.42 M H$_3$PO$_4$. The temperature of the solvent increased from 22° C. to 78° C.

EXAMPLE 8

The same experiment as described in example 7 was repeated, the only difference being the use of an organic solvent composed of 80% tributyl phosphate and 20% tri-octyl/decyl amine by volume. The temperature of the solvent increased from 23° C. to 86° C.

EXAMPLE 9

Crystals of mono-ammonium phosphate were separated from a solvent composed of 80% tributyl phosphate and 20% heptanol by decantation. The separated crystals were fed into an aqueous solution saturated with mono-ammonium phosphate. The crystals were separated from the saturated aqueous solution by centrifugation and dried at 90° C. The organic solvent initially adhering to the crystals formed a separate phase above the aqueous phase. The carbon content of the washed mono-ammonium phosphate crystals was found to be lower than carbon contents of commercial high-purity mono ammonium phosphate salts. Similar results were obtained when using a solvent composed of 80% tributyl phosphate and 20% tri-octyl/decyl amine.

EXAMPLE 10

Crystals of mono-ammonium phosphate were fed into an aqueous solution saturated with di-ammonium phosphate. The pH of the aqueous solution was thereafter adjusted to a value of 8.3 by addition of gaseous anhydrous ammonia. The crystalline solids were thereafter separated from the saturated aqueous solution and dried. The solids were found to be composed of essentially di-ammonium phosphate. Thus, crystals of mono-ammonium phosphate could be converted into crystals of di-ammonium phosphate.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for production of ammonium phosphates, comprising the steps of:
   providing a phosphorus-loaded water immiscible liquid phase;
   adding anhydrous ammonia to said phosphorus-loaded water immiscible liquid phase;
   precipitating at least one of mono-ammonium phosphate and di-ammonium phosphate from said water immiscible liquid phase;
   controlling a temperature of the water immiscible liquid phase during said steps of adding and precipitating;
   extracting said precipitated at least one of mono-ammonium phosphate and di-ammonium phosphate from said water immiscible liquid phase;
   washing away residual water immiscible liquid phase from crystals of said extracted precipitated at least one of mono-ammonium phosphate and di-ammonium phosphate;
   said step of washing away residual water immiscible liquid phase comprises washing said crystals of said extracted precipitated at least one of mono-ammonium phosphate and di-ammonium phosphate with a washing liquid comprising saturated aqueous solution of ammonium phosphate;
   drying said washed crystals;
   separating said residual water immiscible liquid phase washed from said crystals from said washing liquid by phase separation of said residual water immiscible liquid phase in said step of washing away residual water immiscible liquid phase and said washing liquid;
   reusing said separated residual water immiscible liquid phase for further adsorbing of phosphorous in said step of providing a phosphorus-loaded water immiscible liquid phase; and
   reusing said washing liquid separated from residual water immiscible liquid phase in said step of washing away residual water immiscible liquid phase for further washing of crystals.

2. The method according to claim 1, wherein said washing liquid used in said step of washing away residual water immiscible liquid phase is composed of saturated aqueous solution of mono-ammonium phosphate or di-ammonium phosphate for production of mono-ammonium phosphate or di-ammonium phosphate, respectively.

3. The method according to claim 2, further comprising controlling a pH of said saturated aqueous solution of mono-ammonium phosphate to a pH of 2-6 or controlling a pH of said saturated aqueous solution of di-ammonium phosphate to a pH of 6-10 for driving chemical reactions to production of particular compositions of mono-ammonium phosphate or di-ammonium phosphate.

4. The method according to claim 3, wherein said controlling of a pH of said saturated aqueous solution of mono-ammonium phosphate comprises addition of phosphoric acid or ammonia and said controlling of a pH of said saturated aqueous solution of di-ammonium phosphate comprises addition of ammonia.

5. The method according to claim 1, wherein said step of providing a phosphorus-loaded water immiscible liquid phase comprises the step of adsorbing phosphorous from a phosphorous-containing aqueous solution into a liquid scavenger having affinity for phosphorous, thereby creating a scavenger loaded with phosphorous, whereby said scavenger loaded with phosphorous forms said phosphorus-loaded water immiscible liquid phase; and said method comprises the further step of reusing regenerated water immiscible liquid phase formed by said step of extracting said precipitated at least one of mono-ammonium phosphate and di-ammonium phosphate from said water immiscible liquid phase for further adsorbing of phosphorous.

6. The method according to claim 1, wherein said step of adding comprises monitoring of a conductivity of said water immiscible liquid phase and controlling an amount of added anhydrous ammonia in response to said monitored conductivity.

7. The method according to claim 1, wherein said step of adding comprises monitoring of a pH of said water immiscible liquid phase and controlling an amount of added anhydrous ammonia in response to said monitored pH.

8. The method according to claim 1, wherein said step of controlling a temperature comprises extraction of heat from said water immiscible liquid phase before, during and/or after said steps of adding and precipitating.

9. The method according to claim 8, wherein said anhydrous ammonia is gaseous ammonia, said method further comprising: a step of producing said gaseous ammonia from liquid ammonia by heating with at least a part of said heat extracted from said step of controlling a temperature.

10. The method according to claim 8, wherein said step of drying utilizes at least a part of said heat extracted from said step of controlling a temperature.

* * * * *